US006318183B1

(12) United States Patent
Czarnocki

(10) Patent No.: US 6,318,183 B1
(45) Date of Patent: Nov. 20, 2001

(54) MULTIPLE ELEMENT PRESSURE SENSOR HAVING A SELECTIVELY PRESSURE SENSOR RANGE

(75) Inventor: Walter Czarnocki, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/218,877

(22) Filed: Dec. 22, 1998

(51) Int. Cl.[7] .................................................. G01L 7/08
(52) U.S. Cl. ............................................................ 73/715
(58) Field of Search .............................. 73/708, 720, 721, 73/726, 727, 716; 338/4, 22 R, 42; 128/716, 724, 725, 736, 639, 640

(56) References Cited

U.S. PATENT DOCUMENTS 5,184,515 * 2/1993 Terry et al. ............................. 73/727
5,394,883 * 3/1995 Neuman .................................. 128/724
5,677,493 * 10/1997 Yamamoto et al. ...................... 73/727

* cited by examiner

Primary Examiner—William Oen
(74) Attorney, Agent, or Firm—Nicholas C. Hopman; Simon B. Anolich; Steven A. May

(57) ABSTRACT

A multiple element sensor for sensing pressure, the sensor has a substrate 201 with a diaphragm portion 203. Multiple sensing elements 205, 207, 209, 211 are each disposed on the diaphragm portion 203 of the substrate 201. These sensing elements 205, 207, 209, 211 each have output terminals 231, 232, 233, 234, 235, 236, 237, 238 providing signals 371, 373, 375, 377 indicative of the pressure. A combining circuit 217 has input terminals 337, 339, 341, 343 each coupled to the output terminals 231, 232, 233, 234, 235, 236, 237, 238 of each of the sensing elements 205, 207, 209, 211 respectively. The combining circuit 217 has a combined output terminal 219 for providing an output signal 345 dependent on the plurality of signals 371, 373, 375, 377. By fabricating this structure different pressure sensor ranges can be selected depending on how many of the sensing elements 205, 207, 209, 211 are selected by the combining circuit 217.

6 Claims, 2 Drawing Sheets

−PRIOR ART−

MULTIPLE ELEMENT PRESSURE SENSOR HAVING A SELECTIVELY PRESSURE SENSOR RANGE

FIELD OF THE INVENTION

The present invention relates generally to the field of pressure sensors, and more particularly to a pressure sensor operable over an extended pressure range.

BACKGROUND OF THE INVENTION

Contemporary pressure sensor applications require sensing pressures in a variety of pressure ranges from several kPa (kilo-Pascals) to thousands of kPa. Automotive applications include emission control, low pressure evaporative emissions, exhaust gas recirculation, intake manifold pressure, and fuel systems. A single sensor cannot effectively serve all of these applications because of the wide pressure ranges.

One type of pressure sensor positions a Piezo-Resistive Transducer (PRT) or silicon strain gauge onto a relatively thin diaphragm. When the diaphragm is subjected to varying pressures the diaphragm deflects which causes the strain gauge to output a signal indicative of the varying diaphragm deflections. The cross sectional thickness of the diaphragm and the overall area of the diaphragm define its flexibility, or its tendency to deflect based on a change in pressure. So when subjected to a certain pressure a relatively thin diaphragm will exhibit a relatively large deflection, and a relatively large surface area diaphragm will also exhibit a relatively large deflection. The thinner the diaphragm the harder it is to fabricate accurately with high production yields, and the larger the surface area of the diaphragm the more costly and bulky the sensor becomes. As a practical matter to accurately sense relatively low pressures in certain low pressure applications the diaphragm must be relatively thin. Consistently fabricating thin diaphragms is difficult and time consuming. For a relatively thin diaphragm small diaphragm thickness deviations from a nominal are greatly magnified since a fixed tolerance becomes a larger portion of the diaphragm thickness. This in turn creates large variations in the sensing element span and pressure non-linearity, variations in two parameters which play a major part in determining any sensing element quality.

At present, to cover all the required pressure ranges, custom silicon PRT pressure sensing elements are built for each specific pressure range. These custom sensing elements are implemented with different diaphragm areas and diaphragm thicknesses, and of the different sizes. This makes manufacturing complex. Moreover relatively thin and relatively large surface area diaphragms will cost considerably more to manufacture than thicker and smaller diaphragms because of material cost and manufacturing process complexity.

In current PRT sensors, to meet the sensitivity requirements of low pressure applications a relatively large surface area diaphragm is required. In a monolithic sensor design, which integrates sensing element and electronics on the same die, this relatively large surface area diaphragm leaves less area around the die for a signal conditioning circuit. It creates very inefficient or almost impossible Integrated Circuit (IC) layout of such monolithic die. Moreover a new and different layout has to be made for each substantially different pressure range which is expensive and time consuming. In addition, it is difficult to use timed etch technique to etch the diaphragm because any single type of sensing element can only tolerate a small diaphragm thickness deviation from the nominal. The problem is greatly magnified for sensors where the diaphragm has to have a relatively large surface area and also relatively thin, since a fixed tolerance becomes larger portion of the diaphragm thickness which in turn creates large variations in the sensing element span and pressure non-linearity.

What is needed is an improved pressure sensor that can accurately operate over a wide pressure range that is easier to manufacture.

DETAILED DESCRIPTION OF THE PREFERRED EMBODIMENT

A multiple element sensor for sensing pressure that overcomes the deficiencies of the prior art is described herein. Specifically, in a preferred embodiment a sensor includes multiple strain-gauge type sensing elements mounted onto a common substrate. The substrate is flexible and deflects when subjected to pressure, and each of the sensing elements will output a signal proportional to that deflection. A circuit is used to selectively combine one or more of the sensors—summing their output to provide an increased magnitude. Before delving into the preferred embodiment a brief review of prior art approach will be reviewed.

Figure 1:
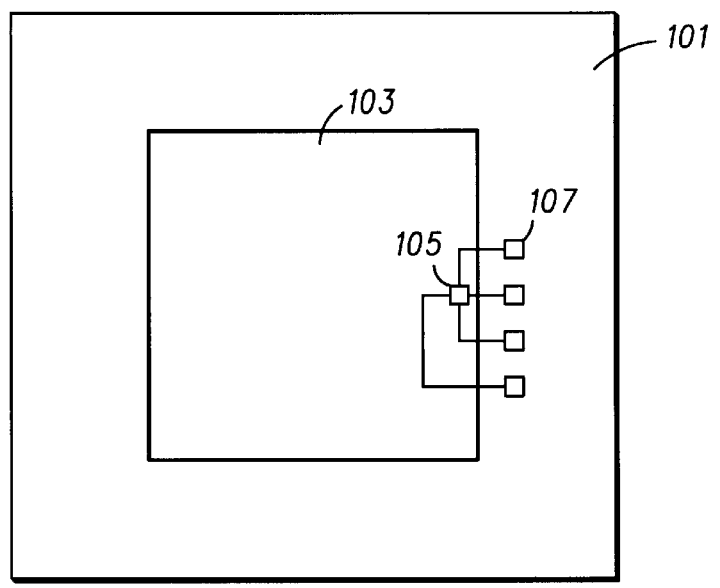
FIG. 1 is a schematic diagram of a prior art pressure sensor.

FIG. 1 is a schematic diagram of a prior art pressure sensor 101. The sensor 101 includes a flexible diaphragm 103. A strain-gauge type sensing element 105 is mounted on a portion of the flexible diaphragm 103.

Figure 2:
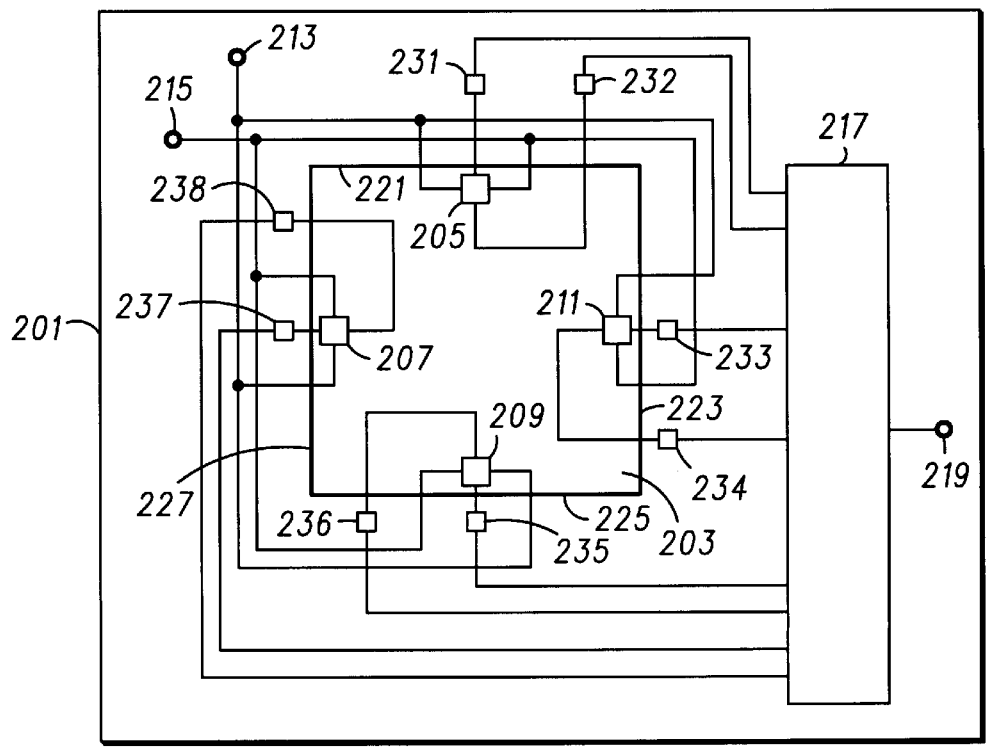
FIG. 2 is a schematic diagram showing a multiple element pressure sensor in accordance with a preferred embodiment of the invention.

FIG. 2 is a schematic diagram showing a multiple element pressure sensor 200 in accordance with a preferred embodiment of the invention. Here a substrate 201 has a diaphragm portion 203. A first sensing element 205 is disposed proximate an edge 221 of the diaphragm 203. The first sensing element 205 has output terminals 231 and 232 and is also connected to power supply terminals 213 and 215. A second sensing element 207 is disposed proximate an edge 227 of the diaphragm 203. The second sensing element 207 has output terminals 237 and 238 and is also connected to power supply terminals 213 and 215. A third sensing element 209 is disposed proximate an edge 225 of the diaphragm 203. The third sensing element 209 has output terminals 235 and 236 and is also connected to power supply terminals 213 and 215. A fourth sensing element 211 is disposed proximate an edge 223 of the diaphragm 203. The fourth sensing element 211 has output terminals 233 and 234 and is also connected to power supply terminals 213 and 215. Each of the output terminals of the sensing elements provide a signal indicative of sensed pressure and are connected to a combining circuit 217. The combining circuit 217 is connected to each of the output terminals of the sensing elements and has an output terminal 219 that outputs a signal indicative of pressure applied to one or more of the sensing elements. Depending on a pressure sensing range of a particular application one or more of the output terminals of the sensing elements will be selected. By using this structure a pressure sensor can be built that has a very wide pressure sensing range. Moreover, a relatively sensitive sensor can be fabricated by using more than one sensing element without reverting to special processing techniques for making very thin diaphragms.

Assuming that each sensor is positioned the same distance from the edge of the diaphragm 203, pressure sensitivity of the sensor 200 can be expressed as follows:

$$s = k * \left(\frac{b}{h}\right)^2$$

where:
b is the area of the diaphragm
h is diaphragm thickness
k is a constant

So sensitivity can be increased by increasing the area of the diaphragm and/or reducing the thickness of the diaphragm. In the improved embodiment, summing the outputs of the four sensor elements shown will yield:

$$s = 4 * k * \left(\frac{b}{h}\right)^2$$

Therefore, if the diaphragm area is unchanged but thickness is 2*h we will get the same sensitivity as for one sensor with thickness h. It is easy to control etching to get h=20 μm, but etching of 10 μm thick diaphragm, another less desirable technique to increase sensitivity, is difficult and will result in low production yields. Also, by using multiple sensor elements the size of the diaphragm can remain relatively small which makes the overall sensor more appealing for space conscious designs. Therefore the described structure is well suited for manufacturing high yield sensitive pressure sensors. As another benefit this structure is that it is easily configurable to manufacture a wide range of pressure sensors by connecting a selected amount of sensing elements 205, 207, 209, 211 to the combining circuit 217. This makes it easy to manage a wide range of products on a production line. Note that the described structure can easily be scaled to have more than the four sensing elements as shown.

Figure 3:
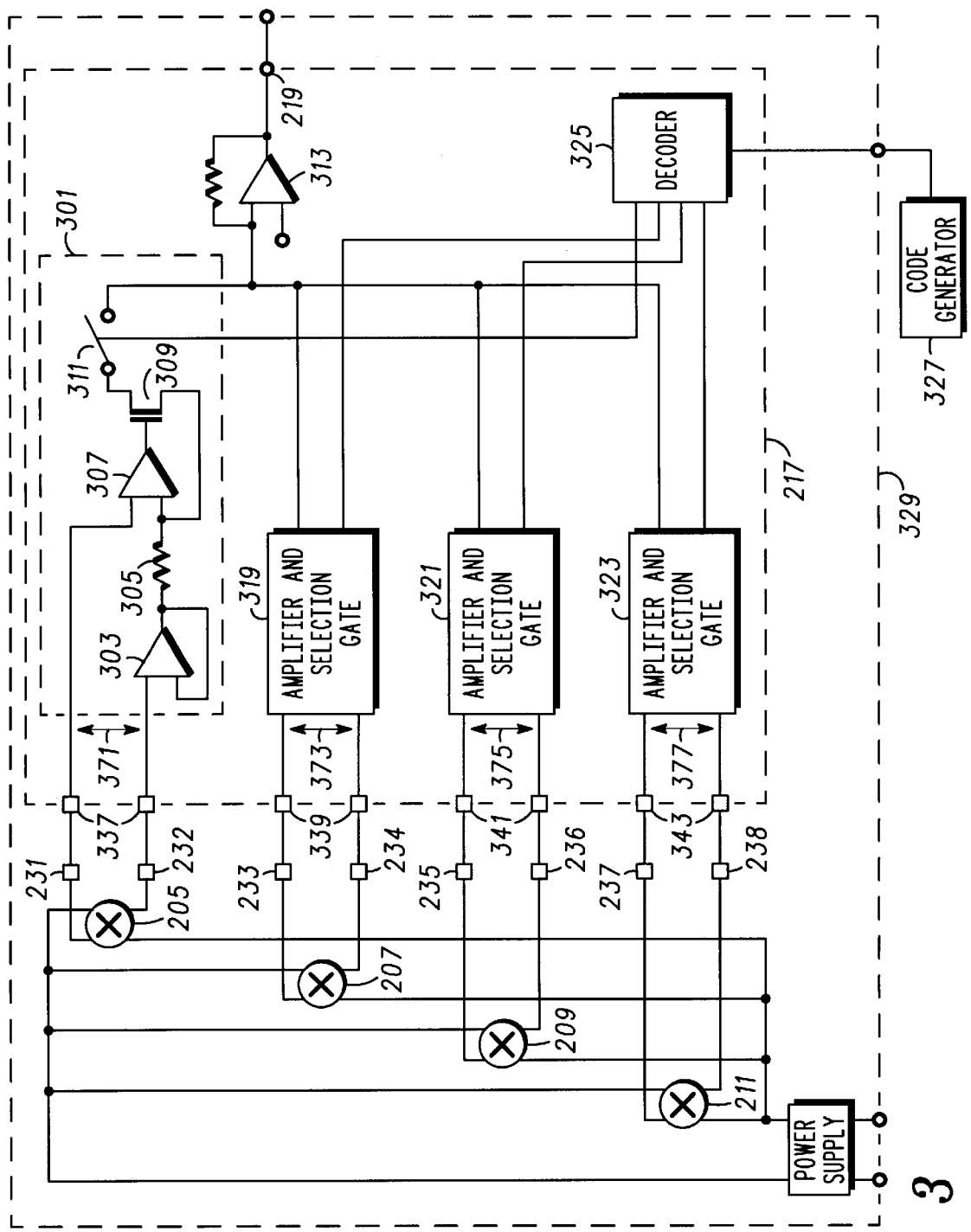
FIG. 3 is a schematic diagram illustrating a circuit for combining the multiple sensor elements introduced in FIG. 2, in accordance with the preferred embodiment of the invention.

FIG. 3 is a schematic diagram illustrating a circuit for combining the multiple sensor elements introduced in FIG. 2. A packaged sensor module 329 includes the sensing elements 205, 207, 209, and 211, the combining circuit and various supporting circuitry.

Output terminals 231, 232, 233, 234, 235, 236, 237, 238 of the first, second, third and fourth sensing elements 205, 207, 209, 211 are coupled to input terminals 337, 339, 341, and 343 of the combining circuit 217. Note that the first sensing element 205 provides a first sensing element signal 371 indicative of pressure; the second sensing element 207 provides a second sensing element signal 373 indicative of pressure; the third sensing element 207 provides a third sensing element signal 375 indicative of pressure; and the forth sensing element 211 provides a fourth sensing element signal 377 indicative of pressure.

The combining circuit 217 includes selection gates 301, 319, 321, and 323. The selection gates are used to selectively combining the output signals of the sensor elements.

Selection gate 301 includes a unity voltage gain amplifier 303 coupled to a second amplifier 307 via a resistor 305. The second amplifier 307 is coupled to a transistor 309 that is coupled to an electronic switch 311. The switch 311 is couplable to a third amplifier 313 under the control of a decoder 325. Note that the other selection gates 319, 321, and 323 are of the same construction as selection gate 301.

The decoder 325 is controlled via an external code generator, or controller 327 during manufacture of the sensor module 329. The code generator sends commands to the decoder 325 to select which of the selection gates 301, 319, 321, and/or 323 and the respective sensor elements are couplable to the combined output terminal 219. Of course other mechanisms for selecting the various sensor elements could also be used.

An improved pressure sensor that can accurately operate over a wide pressure range has been described. This approach has overcome the difficulty of etching relatively thin diaphragms while avoiding relatively large area diaphragms while achieving good sensitivity. Moreover, a single monolithic sensor can be manufactured and afterwards be changed to service one of multiple pressure sensor ranges.

What is claimed is:

1. A multiple element sensor for sensing pressure, the sensor comprising:
   a substrate with a diaphragm portion;
   a plurality of sensing elements each disposed on the diaphragm portion of the substrate, wherein the plurality of sensing elements each having output terminals providing a signal indicative of the pressure such that a plurality of sensing element output signals are produced;
   a combining circuit comprising:
      a plurality of input terminals that are each coupled to the output terminals of each of the plurality of sensing elements respectively;
      a combined output terminal for providing an output signal within a pressure sensing range dependent on the plurality of sensing element output signals,
      a plurality of selection gates each capable of being coupled between one of the plurality of input terminals and the combined output terminal; and
   wherein the combining circuit output signal is determined by the combining circuit selecting one or more of the plurality of sensing elements by connecting to the respective output terminal of the one or more sensing elements.

2. A multiple element pressure sensor in accordance with claim 1 wherein the diaphragm is substantially rectangular and wherein each of the plurality of sensing elements is positioned proximate an edge of the diaphragm and distal from a remaining plurality of sensing elements.

3. A multiple element sensor for sensing pressure, the sensor comprising:
   a substrate with a diaphragm portion;
   a first sensing element disposed on the diaphragm portion, the first sensing element having first output terminals for providing a first sensing element signal indicative of the pressure;
   a second sensing element disposed on the diaphragm portion, the second sensing element having second output terminals for providing a second sensing element signal indicative of the pressure; and
   a combining circuit with first input terminals coupled to the first output terminals of the first sensing element and second input terminals coupled to the second output terminals of the second sensing element, wherein a first selection gate selectively couples the first input terminal to a combined output terminal and a second selection gate selectively couples the second input terminal to the combined output terminal, the combined output terminal providing a combined output signal within a pressure range which is dependent on the first sensing element signal and the second sensing element signal wherein the combining circuit combining the output signals of the first and second sensing elements to produce a combined output signal within the pressure range.

4. A multiple element pressure sensor in accordance with claim 3 wherein the diaphragm is substantially rectangular and wherein each of the first and second sensing elements is positioned proximate an edge of the diaphragm and distal from each other.

5. A multiple element sensor for sensing pressure, the sensor comprising:

a substrate with a diaphragm portion;

a plurality of sensing elements each disposed on the diaphragm portion of the substrate, wherein each sensing element of the plurality of sensing elements has at least one output terminal that provides a sensing element output signal indicative of the pressure; and a combining circuit with a plurality of input terminals, wherein the combining circuit is capable of selectively receiving one or more of the sensing element output signals, wherein the combining circuit produces an output signal based on the one or more sensing element output signals selectively received by the combining circuit, and wherein the combining circuit selects one or more of the sensing element output signals based on a pressure sensing range.

6. A multiple element pressure sensor in accordance with claim 5, wherein the combining circuit comprises a plurality of selection gates for selectively receiving one or more of the sensing element output signals.

* * * * *